United States Patent

Todoriki et al.

[11] Patent Number: 5,059,957
[45] Date of Patent: Oct. 22, 1991

[54] DISPLAY APPARATUS FOR VEHICLE

[75] Inventors: Tsuyoshi Todoriki; Shigeru Okabayashi, both of Kanagawa; Masao Sakata, Tokyo, all of Japan

[73] Assignee: Nissan Motor Company, Limited, Kanagawa, Japan

[21] Appl. No.: 329,225

[22] Filed: Mar. 27, 1989

[30] Foreign Application Priority Data

Mar. 30, 1988 [JP] Japan .................................. 63-74816

[51] Int. Cl.⁵ .............................................. G09G 3/02
[52] U.S. Cl. ..................................... 340/705; 340/980; 340/459; 353/13
[58] Field of Search ............... 340/705, 980, 459, 461, 340/462; 353/13, 14; 350/174, 331 T; 358/252, 253

[56] References Cited

U.S. PATENT DOCUMENTS

| | | | |
|---|---|---|---|
| 4,447,128 | 5/1984 | Ferrer | 350/174 |
| 4,808,978 | 2/1989 | Vernay | 340/980 |
| 4,908,611 | 3/1990 | Iino | 353/13 |

FOREIGN PATENT DOCUMENTS 64-28066 2/1989 Japan .

Primary Examiner—Joseph A. Orsino
Assistant Examiner—Dov Popovici
Attorney, Agent, or Firm—Lowe, Price, Leblance & Becker

[57] ABSTRACT

A CRT display system for a vehicle is provided, the system comprises a CRT for displaying images, vehicle information, or so forth, a liquid crystal panel assembly disposed in front of the CRT, a vehicle information sensor, and control means for the liquid crystal panel. The vehicle information sensor is adapted for determining whether the vehicle is running or not and whether an ambient light level is high or low to provide signals indicative thereof. The control means is operable to control the transmission factor of the liquid crystal panel so as to limit a visual angle for the driver in response to the signals output from the vehicle information sensor. When the ambient light level is low and the vehicle is running, the control means controls the liquid crystal panel assembly so as to reduce the transmission factor thereof to a first level with the result that no images from the CRT are projected to the driver through the panel assembly although passengers may clearly see the images. When the vehicle is parked, the images from the CRT are provided to the driver and passengers. On the other hand, when the ambient light level is low and the vehicle is running, the transmission factor is reduced to a second level lower than the first level to interrupt the light of images from the CRT to the driver completely, although passengers may clearly see the images.

14 Claims, 5 Drawing Sheets

DISPLAY APPARATUS FOR VEHICLE

BACKGROUND OF THE INVENTION

The present invention relates generally to a display apparatus for a vehicle. More particularly, the invention relates to a display apparatus comprising a filter for restricting a visual range of images displayed on the screen of a CRT with respect to a driver in response to ambient light levels and vehicular running.

In the previously proposed image displaying apparatus, a louver type filter is disposed in front of a CRT so that a visible angle is limited to directions excluding a particular direction in order to prevent the images displayed on the screen of a CRT from being viewed from a vehicular driver's seat during vehicle operation in order to assure driving safety.

While the vehicle is moving, a louver type filter is mounted by a viewer in front of the CRT so that louvers in the filter cause light directed to the driver's seat to be interrupted. The filter however allows the images of the CRT to be projected to the passenger's seat.

When the vehicle stops and parks, the images on the CRT can be viewed from all vehicular seats including the driver's seat.

Another image displaying apparatus has been proposed which includes a liquid crystal panel for controlling a visual angle in place of the louver type filter due to the inconvenience of mounting on and removing it from the CRT. For example, Japanese Utility Model First Publication (jikkaisho) No. 64-28066 exemplifies such a conventional display apparatus.

In this apparatus, controlling means is provided. The controlling means operates to apply a voltage to the liquid crystal panel during running of the vehicle to interrupt the light from the CRT toward the driver's seat and applies no voltage to it when stopped, therefore the images from the CRT can be transmitted in all directions.

However, the transmission factor ratio of such filters is relatively small. The images displayed on the screen of the CRT are visible through the liquid crystal panel during night driving. This gives the driver some distraction.

SUMMARY OF THE INVENTION

It is accordingly an object of the present invention to provide a display apparatus for controlling the transmission of images to a driver in response to ambient light levels and vehicular running.

According to one aspect of the present invention, there is provided an apparatus for providing images from a display source within a vehicle, which comprises filter means, having variable transmission factor, for adjusting visual recognition area of the images appearing on the display so that light from the images directed toward a driver's seat of the vehicle is interrupted, first detecting means for detecting vehicle run status to provide a signal indicative thereof, second detecting means for detecting an ambient light level to provide a signal indicative thereof, and control means for controlling said filter means so as to provide no image from the display toward the driver's seat during driving in response to the signal output from the first detecting means, the control means controlling the transmission factor of the filter means based on the signal output from the second detecting means.

According to another aspect of the invention, there is provided a display apparatus for a vehicle which comprises a display for providing images of interest to a driver and passengers, a filter assembly, including a plurality of filters, disposed in front of the display, the filter assembly limiting visual recognition area of the images so that no light of the images is transmitted to the driver therethrough, first detecting means for detecting vehicle run status to provide a signal indicative thereof, second detecting means for detecting a first ambient light level and a second ambient light level higher than the first light level to provide a first light level signal indicative of the first light level and a second light level signal indicative of the second light level, and controlling means for controlling the filter assembly to provide a first transmission factor thereof in response to the first light level signal and the signal from the first detecting means and a second transmission factor thereof higher than the first transmission factor in response to the second light level signal and the signal from the first detecting means so that no image provided on the display is transmitted to the driver through the filter assembly during driving regardless of the variation of ambient light levels.

The filter assembly may be a liquid crystal panel assembly provided with a pair of liquid crystal panels. The control means provides voltage applications having different levels to the liquid crystal panel assembly to vary the transmission factor thereof. Alternatively, the control means controls the pair of panels individually and provides a voltage application to one of the liquid crystal panels in response to the second light level signal and provides the voltage application to both liquid crystal panels in response to the first light level to vary the transmission factor thereof according to the variation of ambient light level.

DESCRIPTION OF THE PREFERRED EMBODIMENT

Figure 1:
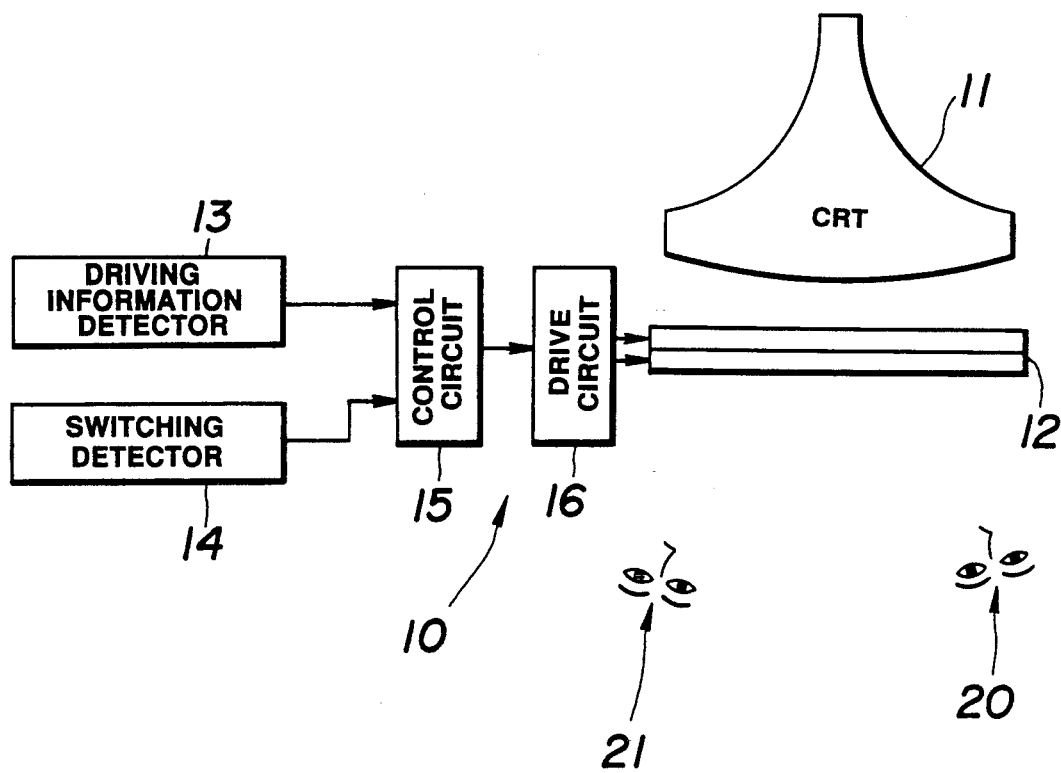
FIG. 1 is a block diagram which shows a display apparatus according to the invention.

Referring now to the drawings, wherein like numbers refer to like parts in the several views, particularly to FIG. 1, a display system 10 according to the present invention is shown. The display system 10 comprises a CRT (Cathode Ray Tube), a liquid crystal panel assembly 12, a drive circuit for the liquid crystal panel, a control circuit 15, a vehicle information detector 13, and a switching detector 14. The CRT is mounted in a vehicle for example in a center console box and displays images, or information of interest to a driver and/or passengers 21 (only one is shown). The liquid crystal panel assembly 12 is provided with two liquid crystal panels attached to each other and disposed in front of the CRT 11. Liquid crystal elements may be interposed between deflecting plates to form the liquid crystal panel. The panel assembly 12 functions as a visual angle controlling filter for limiting a visual recognition area of the images directed toward a driver's seat 20 of the vehicle. This limitation of the visual area in the driver's seat direction may be effected by means of a liquid crystal panel in which a plurality of liquid crystal elements are inclined and arranged toward the driver. Alternatively, the limitation may be achieved by inclining the liquid crystal panel assembly toward the driver at a predetermined angle. The drive circuit 16 is operable to control a voltage level for the liquid crystal panel 12 so as to vary brightness of the displayed images by means of an oscillator or so forth. The vehicle information detector 13 detects a run state or stopped state of the vehicle to provide an information signal indicative thereof. The switching detector 14 detects an on-off state of headlamps, i.e., an ambient light level to provide a headlamp signal indicative thereof. The control circuit 15 is operable to control the liquid crystal panel assembly 12 in response to the information signal and the headlamp signal. It will be thus appreciated that the display system according to the invention controls display of the image information provided on the CRT for the driver according to running of the vehicle and/or the ambient light level.

Figure 2:
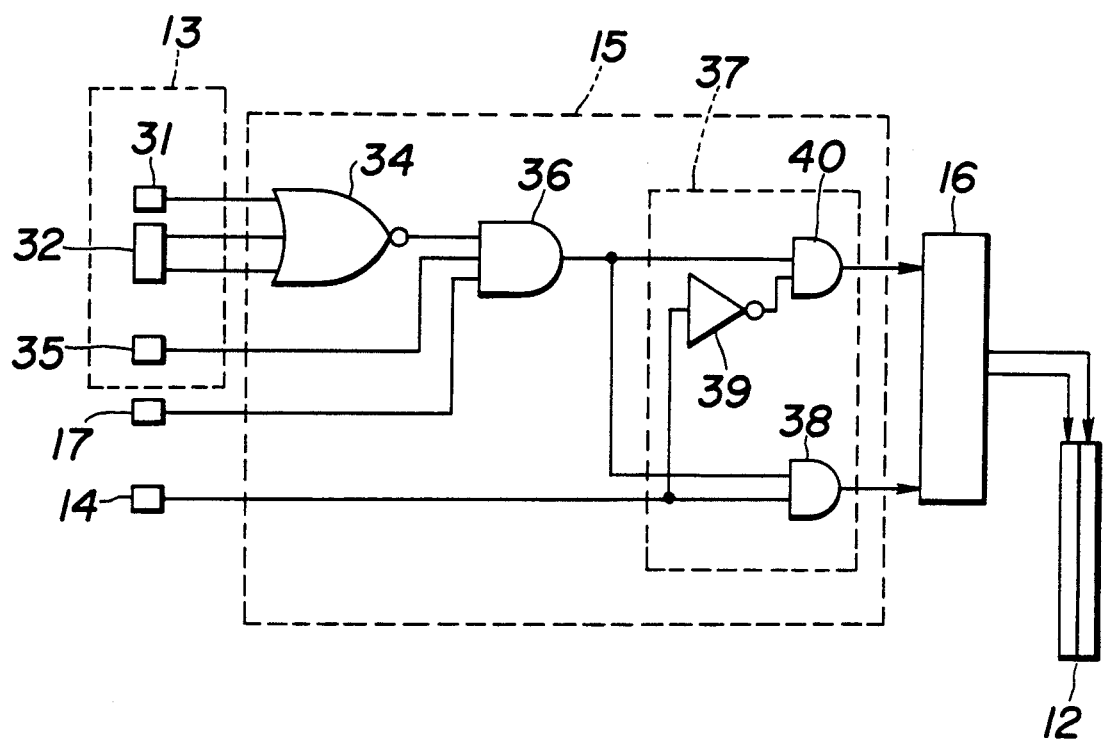
FIG. 2 is a circuit diagram of a first embodiment of a display apparatus.

Referring to FIG. 2, the vehicle information detector 13 includes generally an auxiliary brake sensor, or a parking brake sensor 31, a shift selector for an automatic transmission sensor 32, and a speed sensor 35. For vehicles with a manual transmission, a manual shift lever sensor as the sensor 32 may be provided. The parking brake sensor 31 senses an operation of a parking brake lever to provide a parking brake signal indicative thereof, or a "1" signal. The shift selector sensor 32 senses a neutral position and a parking position of the automatic transmission to either provide a "N" signal or a "P" signal representative thereof, or a "1" signal. In addition, the speed sensor 35 senses vehicular speed to provide a speed signal, or a "1" signal when the magnitude of speed is greater than a predetermined threshold. For example, a speed pulse sensor may be provided. The speed pulse sensor is adapted for counting the number of pulses indicative of the number of rotation of a power transmission shaft for example. When the number of the pulses are more than a predetermined pulse number per minute, a speed signal indicating that the vehicle is running is outputted.

The control circuit 15 comprises a NOR circuit 34, an AND circuit 36, and a voltage control circuit for the liquid crystal panel 37. The NOR circuit 34 provides a signal "0" or "1" to the AND circuit in response to the signals from the parking brake sensor 31 or the shifting selector sensor 32. In addition, in an input port of the AND circuit 36, a switching signal indicative of "ON" or "OFF" state of the CRT 11 is inputted from a CRT switching sensor 17. The voltage control circuit 37 includes AND circuits 38 and 40 and a NOT circuit 39 and is operable to provide a signal to the liquid crystal drive circuit 16 in response to the signals from the AND circuit 36 and the switching detector for the headlamps 14.

While the vehicle is stopped, e.i., the driver does not attend to driving, signals "1" from the parking brake sensor 31 and the shift selector sensor 32 exist on the input lines of the NOR circuit 34. The NOR circuit 34 therefore provides a "0" signal to the AND circuit 36. On the output line of the speed sensor to the AND circuit 36, a "0" signal exist. Moreover, when the CRT 11 is operated, a "1" signal indicative thereof exists on the output line of the CRT switching sensor 17 to the AND circuit 36. The AND circuit 36 therefore provides a "0" signal to the voltage control circuit 37. This "0" signal is inputted into the AND circuits 38 and 40. The drive circuit 16 thus applies no voltage to the liquid crystal panel 12. It will be noted that the driver 20 can see the images displayed on the CRT 11.

During driving, the display system 10 according to the invention provides two operation modes. One relates to driving in the day time. The other relates to night driving.

When the vehicle is running while operating the CRT 11, the parking brake sensor 31 and the shift selector sensor 32 provide "0" signals to the NOR circuit 34 respectively. A "1" signal from NOR circuit 34 and a "1" signal from the speed sensor 35 are outputted to the AND circuit 36. In addition, the CRT switching sensor 17 provides a "1" signal to the AND circuit 36. The AND circuit 36 therefore outputs a "1" signal to one of each input ports of the AND circuits 38 and 40 of the voltage control circuit 37 respectively. For day time, the switching detector 14 provides a "0" signal to the AND circuit 38 and the NOT circuit 39. This NOT circuit 39 is operable to change the "0" signal to a "1" signal and outputs the "1" signal to the AND circuit 40. Therefore, the AND circuit 38 provides a "0" signal to the drive circuit 16, while the AND circuit 40 provides a "1" signal to the drive circuit 16. The drive circuit 16 is adapted for supplying a high level voltage to the liquid crystal panel 12 in response to a signal from the AND circuit 38 and low level voltage thereto in response to a signal from the AND circuit 40 to control the brightness, or the transmission factor of the liquid crystal panel. Therefore, the drive circuit 16 provides the low level voltage application to the liquid crystal panel 16 in response to the "1" signal from the AND circuit 40 with the result that the liquid crystal panel becomes black.

On the other hand, for the night driving, e.i., when the headlamps are turned on, the switching detector 14 provides a "1" signal to the input ports of the AND circuit 38 and the NOT circuit 39. The NOT circuit outputs a "0" signal to the AND circuit 40. The AND circuit therefore provides a "0" signal to the drive circuit 16. On the both input port lines of the AND circuit 38, the "1" signals exist. Thus, the AND circuit 38 provides a "1" signal to the drive circuit 16. The drive circuit 16 provides a high level voltage application to the liquid crystal panel 12. It will be appreciated that the liquid crystal panel becomes more black than when the low voltage is supplied thereto.

Accordingly, the liquid crystal panel may interrupt perfectly the transmission of image displayed on the screen of the CRT to the driver according to the ambient light levels.

Figure 3:
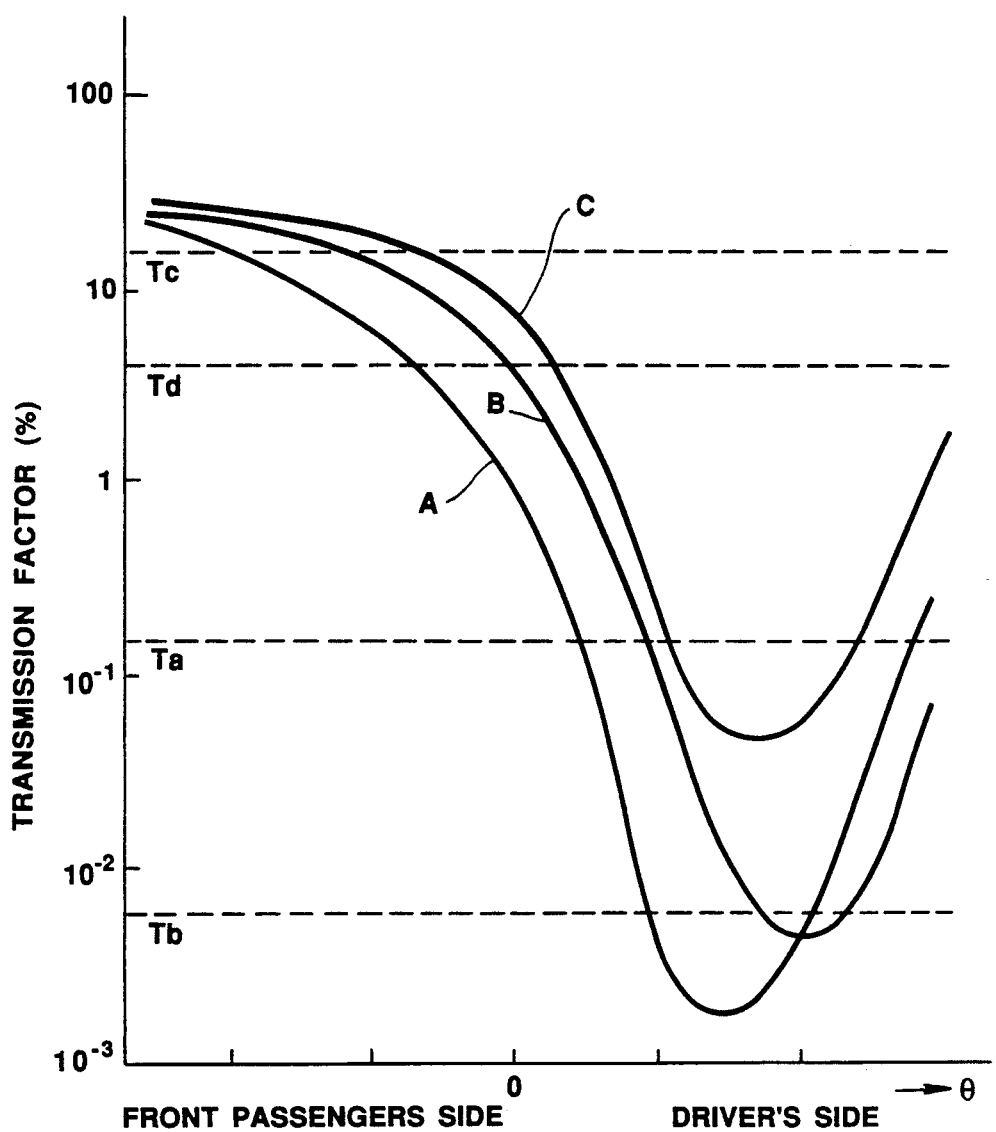
FIG. 3 is a graph which shows the transmission factor of a liquid crystal panel provided in a display apparatus according to the invention.

Referring to FIG. 3, the transmission factor of the liquid crystal panel according to the invention is dependent upon the voltage applications shown. The axis of abscissa indicates a field view range in which the driver and the passengers can view the image displayed on the screen of the CRT through the liquid crystal panel 12. The axis of ordinate indicates the transmission factor. The dotted line "Tb" indicates the critical transmission factor under which the images of CRT for the driver is interrupted completely at night, while the line "Ta" indicates the critical transmission factor under which no image is provided for the driver in daytime. The line "Td" indicates the critical transmission factor above which a clear display of the CRT is provided for the passengers at night, while the line "Tc" indicates the critical transmission factor above which a clear display is available for the passengers in daytime. The curve "A" shows that the variation of the transmission factor within the field view range when the headlamps are turned on during night driving and the high voltage level application is provided to the liquid crystal panel. As can be seen from this graph, in the driver's field of view, the transmission factor is lower than the "Tb" value. It will be understood that the driver cannot view the images displayed by the CRT through the liquid crystal panel, while the passengers can view them. The curve "B" shows the variation of the transmission factor during the daytime driving, e.i., when the headlamps are turned off and low voltage is supplied to the liquid crystal panel. It will be also understood that the driver cannot view the images of the CRT, while the passengers can view them. The curve "C" relates a display system according to a second embodiment to be described hereinafter.

Figure 4:
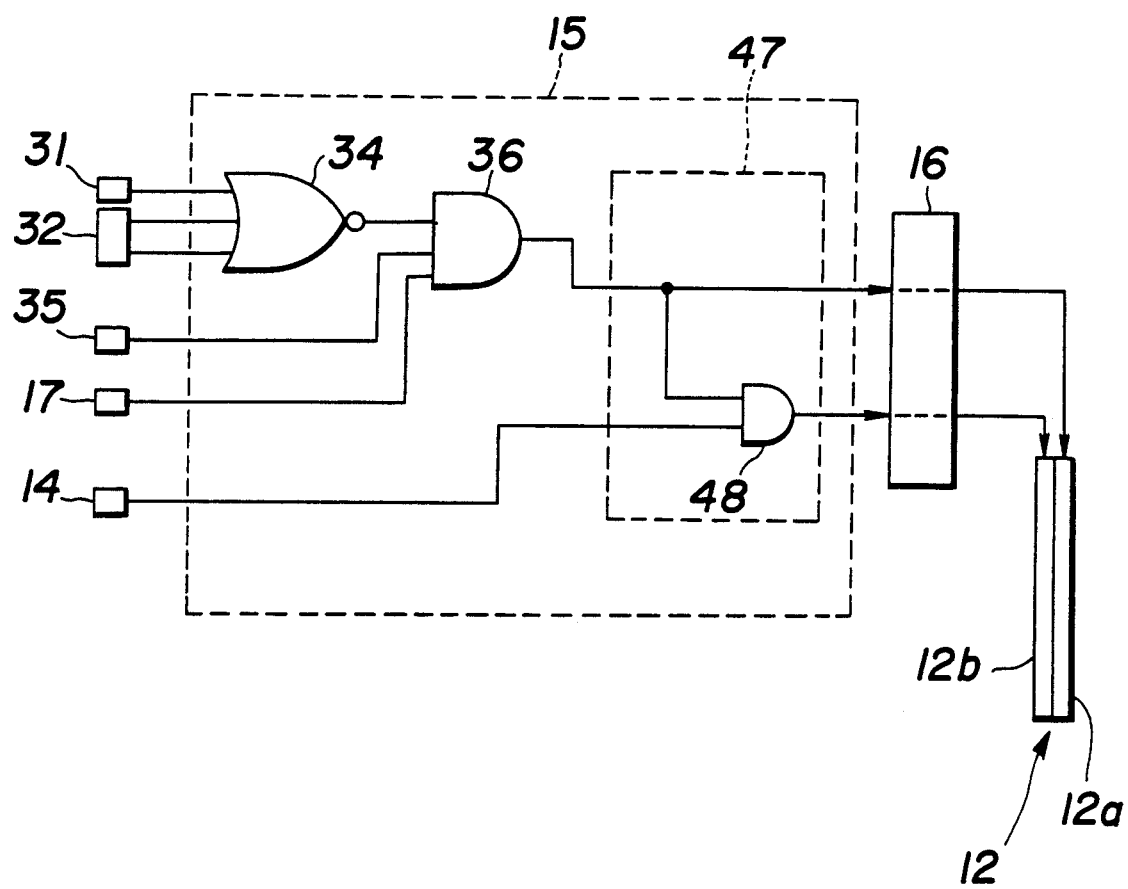
FIG. 4 is a circuit diagram of a second embodiment of a display apparatus.

Referring to FIG. 4, there is illustrated a display system of a second embodiment according to the invention. In the control circuit 15 of the second embodiment, since only the liquid drive circuit 47 is different from the above described embodiment, the elements common to first embodiment will be omitted.

A liquid crystal panel assembly 12 is comprised of a pair of liquid crystal panels 12a and 12b. These panels are independently controlled by a drive circuit 16. A liquid drive circuit 47 includes an AND circuit 48.

During daytime driving, a "1" signal output from the AND circuit 36 is input directly to the drive circuit 16. The drive circuit 16 operates only the liquid crystal panel 12a to cause the panel to become black. During night driving, in addition to the "1" signal from the AND circuit 36, a "1" signal from the switching detector 14 is input to the AND circuit 48. The AND circuit 48 provides a "1" signal to the drive circuit 16 to drive the other liquid crystal panel 12b. It will be thus appreciated that both panels 12a and 12b become black to reduce the transmission factor thereof so as to interrupt a light of the images from the CRT toward the driver's seat.

In FIG. 3, the curves "A" and "C" show the transmission factors of the liquid crystal panel assembly according to the second embodiment. When the ambience is light and the headlamps are turned off, only liquid crystal panel 12a is operated. This gives the panel assembly 12 a transmission factor ratio of about 500:1 and a transmission factor is provided as shown by the curve "C". The curve "C" shows that the transmission factor for cutting light of images of the CRT in the driver's seat direction is less than Ta and the transmission factor for allowing it to be propagated to in passengers' seat direction is more than Tc. When the ambient light is low and the headlamps are turned off, both liquid crystal panels 12a and 12b are operated, reducing the transmission factor. This gives the panel assembly 12 a transmission factor, as shown by the curve "A", similar to the first embodiment. It will be noted that the driver cannot see the images displayed on the screen of the CRT through the liquid crystal panel assembly 12.

Figure 5:
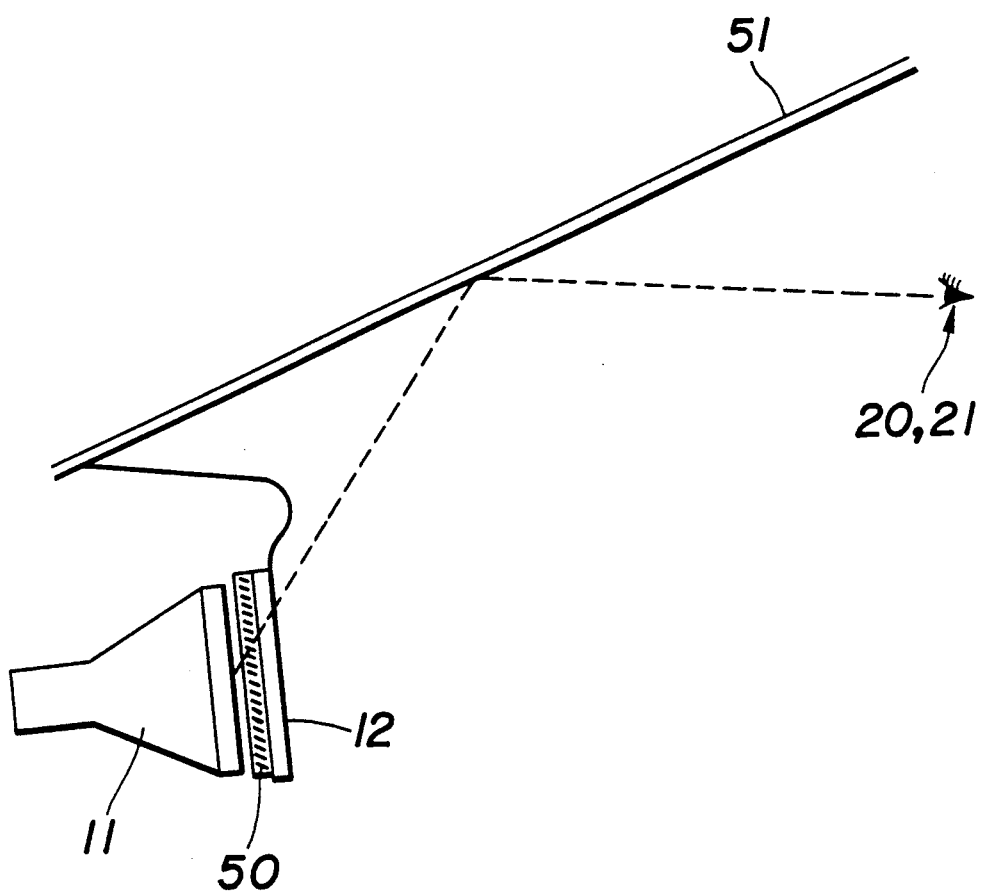
FIG. 5 is a schematic block diagram of a third embodiment of the invention.

Referring to FIG. 5, a display system of a third embodiment according to the invention is shown. The system includes a louver type filter 50 for restricting a vertical visual angle in addition to the above described display systems. The filter 50 is disposed on a liquid crystal panel 12. The function of the filter 50 is such that the filter transmits light in the forward direction, while light in the vertical direction is interrupted. It will be noted that a reflection of images from a CRT 11 onto a windshield 51 is prevented to provide a clear view for driver 20 and passengers 21.

Therefore, in the display systems according to the invention, the transmission factor of a liquid crystal panel can be controlled in response to ambient light levels to insure perfectly that no image is displayed from the screen of a CRT from the angle of a driver and yet provides a clear view to passengers during driving.

As described above, a speed pulse sensor for counting the number of rotations per minute of a power transmission shaft for example is provided as a vehicle information monitor. The speed pulse sensor is adapted for determining the vehicle to be stopped when no pulse is generated within a predetermined period of time. However, if this unit of time is set relatively short, a frequent repeat of stopping and starting of the vehicle due to a traffic jam tends to repeat the switching of a liquid crystal panel frequently. Accordingly, a relatively long unit of time is preferably provided so that even when the vehicle is running at a low speed or repeats stopping and starting frequently, the sensor determines the vehicle to be running. The provision of the relatively long unit of time for counting the number of pulses can prevent the liquid crystal panel from operating frequently.

In the above described embodiments, two liquid crystal panels are provided to form a liquid crystal panel assembly as a filter for limiting a visual recognition area. Only one liquid crystal panel is however applicable to the display system according to the invention as long as the panel can provide the transmission factor enough to interrupt a light of images from a CRT.

What is claimed is:

1. An apparatus for providing images from a display source within a vehicle comprising:
    filter means, having variable transmission factor, for adjusting visual recognition area of the images appearing on the display so that light from the images directed toward a driver's seat of the vehicle is interrupted;
    first detecting means for detecting vehicle run status to provide a signal indicative thereof;
    second detecting means for detecting an ambient light level to provide a signal indicative thereof; and
    control means for controlling said filter means so as to provide no image from the display toward the driver's seat during driving in response to the signal output from said first detecting means, said control means controlling the transmission factor of said filter means based on the signal output from said second detecting means regardless of said vehicle run status.

2. An apparatus as set forth in claim 1, wherein said filter means is a filter assembly provided with a pair of filter panels overlapped each other.

3. An apparatus as set forth in claim 1, wherein said control means applies voltage having a predetermined level to said filter means to reduce the transmission factor thereof.

4. An apparatus as set forth in claim 1, wherein said first detecting means is a parking brake sensor for detecting operation of the parking brake of the vehicle.

5. An apparatus as set forth in claim 1, wherein said first detecting means is a speed sensor for counting a number of pulses representative of the number of rotations of a power transmission shaft of the vehicle during a predetermined period of time.

6. An apparatus as set forth in claim 1, wherein said first detecting means is a shift selector sensor which provides a signal indicative of vehicle stop when a shift select lever is positioned in a neutral or parking position.

7. An apparatus as set forth in claim 3, wherein said second detecting means is a headlamp switch of the vehicle which provides a signal according to the ON and OFF state thereof.

8. An apparatus as set forth in claim 2, wherein said pair of filter panels is liquid crystal panels.

9. An apparatus for providing images from a display source within a vehicle comprising:
   filter means, having variable transmission factor, for adjusting visual recognition area of the images appearing on the display so that light from the images directed toward a driver's seat of the vehicle is interrupted, said filter means comprising a pair of overlapped filter panels;
   first detecting means for detecting vehicle run status to provide a signal indicative thereof;
   second detecting means for detecting an ambient light level to provide a signal indicative thereof; and
   control means for controlling said filter means so as to provide no image from the display toward the driver's seat during driving in response to the signal output from said first detecting means, said control means controlling the transmission factor of said filter means based on the signal output from said second detecting means;
   wherein said second detecting means detects a first ambient light level and a second ambient light level higher than said first level and provide first and second signals indicative thereof respectively, said control means providing a first voltage application to said filter assembly in response to said first signal and providing a second voltage application whose voltage level is lower than that of said first voltage application to said filter assembly in response to said second signal to vary the transmission factor according to the variation of the ambient light level so that no image is provided to the driver during driving regardless of said variation of the ambient light level.

10. An apparatus for providing images from a display source within a vehicle comprising:
    filter means, having variable transmission factor, for adjusting visual recognition area of the images appearing on the display so that light from the images directed toward a driver's seat of the vehicle is interrupted, said filter means comprising a pair of overlapped filter panels;
    first detecting means for detecting vehicle run status to provide a signal indicative thereof;
    second detecting means for detecting an ambient light level to provide a signal indicative thereof; and
    control means for controlling said filter means so as to provide no image from the display toward the driver's seat during driving in response to the signal output from said first detecting means, said control means controlling the transmission factor of said filter means based on the signal output from said second detecting means;
    wherein said second detecting means detects a first ambient light level and provides a first signal indicative thereof and detects a second ambient light level higher than said first level and provides a second signal indicative thereof, said control means applying voltage having a predetermined level to one of said pair of filter panels in response to said second signal and applying said voltage to both filter panels in response to said first signal to reduce the transmission factor thereof so as to provide no image to the driver during driving regardless of the variation of the ambient light level.

11. A display apparatus for a vehicle comprising:
    a display for providing images of interest to a driver and passengers;
    a filter assembly, including a plurality of filter panels, disposed in front of said display, said filter assembly limiting visual recognition area of said images so that no light of said images is transmitted to the driver therethrough;
    first detecting means for detecting vehicle run status to provide a signal indicative thereof;
    second detecting means for detecting a first ambient light level and a second ambient light level higher than said first light level to provide a first light level signal indicative of said first light level and a second light level signal indicative of said second light level; and
    controlling means for controlling said filter assembly to provide a first transmission factor thereof in response to said first light level signal and said signal from the first detecting means and a second transmission factor thereof higher than said first transmission factor in response to said second light level signal and said signal from the first detecting means so that no image provided on said display is transmitted to the driver through said filter assembly during driving regardless of the variation of ambient light levels.

12. An apparatus as set forth in claim 11, wherein said filter assembly is a liquid crystal panel assembly provided with a pair of liquid crystal panels.

13. An apparatus as set forth in claim 12, wherein said control means provides voltage applications having a different levels to said liquid crystal panel assembly to vary the transmission factor thereof.

14. An apparatus as set forth in claim 12, wherein said control means controls said pair of liquid crystal panels individually, said control means providing a voltage application to one of said liquid crystal panels in response to said second light level signal and providing said voltage application to both liquid crystal panels in response to said first light level to vary the transmission factor thereof according to the variation of ambient light level.

* * * * *